United States Patent [19]
Marsh, Jr.

[11] 3,958,817
[45] May 25, 1976

[54] DOUBLE TAPERED PIPE COUPLING
[76] Inventor: Richard O. Marsh, Jr., 701 Standard Life Bldg., Pittsburgh, Pa. 15222
[22] Filed: Jan. 24, 1975
[21] Appl. No.: 543,968

Related U.S. Application Data
[60] Continuation-in-part of Ser. No. 438,635, Feb. 1, 1974, abandoned, which is a division of Ser. No. 270,715, July 11, 1972, abandoned.

[52] U.S. Cl. .................................. 285/16; 285/113; 285/175; 285/334.4
[51] Int. Cl.² ........................................ F16L 17/02
[58] Field of Search .................. 285/334.4, 16, 237, 285/113, 175, 9 R, 177, 111; 174/65 R

[56] References Cited
UNITED STATES PATENTS

| | | | |
|---|---|---|---|
| 935,412 | 9/1909 | Rust | 285/334.4 |
| 1,009,303 | 11/1911 | Hansen | 285/16 |
| 1,743,431 | 1/1930 | Congable | 285/334.4 X |
| 1,802,700 | 4/1931 | Boker | 285/334.4 X |
| 2,480,791 | 8/1949 | Valerius | 285/334.4 X |
| 2,914,345 | 11/1959 | Osborn | 285/113 X |
| 3,315,970 | 4/1967 | Holloway | 285/111 X |

FOREIGN PATENTS OR APPLICATIONS

| | | | |
|---|---|---|---|
| 103,326 | 3/1966 | Denmark | 285/334.4 |
| 6,705,487 | 10/1968 | Netherlands | 174/65 R |

Primary Examiner—Thomas F. Callaghan
Attorney, Agent, or Firm—Buell, Blenko, and Ziesenheim

[57] ABSTRACT

The specification discloses a sleeve type coupling for providing a limited flexible connection between two sections of pipe, particularly large diameter pipe such as shore dredge pipe. The coupling has an overall length in the range of 1½ to 2 times the diameter of the pipe sections to be coupled and is of uniform wall thickness tapering uniformly from end to end except for a relatively short section intervening between the opposite end sections. The end sections are tapered in the range of 3½° to 5° with respect to the longitudinal axis and the section intervening between the end sections is of a length approximately 0.15 to 0.20 times the diameter of the pipe sections to be coupled, and is tapered at an angle to the longitudinal axis substantially larger than that of the end sections. Another embodiment of sleeve coupling comprises an inwardly tapered downstream end section, a generally cylindrical upstream end portion closely surrounding the upstream pipe section and an intervening tapered section of relatively steep slope on which the end of the upstream pipe section abuts. The cylindrical end portion is adapted to be sealed by an annular seal to the upstream pipe section. Another embodiment of sleeve coupling is similar to the previously described one except that a wear sleeve is secured inside the coupling sleeve at the intervening tapered section for resisting wear due to effluent abrasion on the coupling itself.

5 Claims, 3 Drawing Figures

DOUBLE TAPERED PIPE COUPLING

This application is a continuation-in-part of my co-pending application Ser. No. 438,635, filed Feb. 1, 1974, now abandoned which in turn is a division of my application Ser. No. 270,715, filed July 11, 1972, now abandoned.

This invention relates to a sleeve type threadless coupling for providing a simple and rapid connection between sections of pipe, such as shore dredge pipe, which require temporary communication while permitting some degree of flexure at the point of connection.

Present-day practice for connecting sections of shore dredge pipe is to provide pipe sections, one end of which is slightly tapered, for example about a 3° slope for a length of 12 to 15 inches. Sections of pipe are joined by telescopically inserting the downstream tapered end of one pipe section into the upstream end of an adjacent pipe section. Two hooks or handles are customarily welded to each end of each pipe section and a tension connection is established at the joint, as by connecting the handles with a wire and turnbuckles.

Some present-day pipe manufacturers are equipped to form tapered ends on the pipe section by use of mechanical shrinkers or by forcing the pipe end into a die or dies. Other manufacturers form the tapered pipe ends by cutting patterns in flat steel sheets or plates, rolling and then welding the ends together. The tapered pipe ends are then welded to the length of pipe of uniform diameter.

Under service conditions during dredging operations, when dredge effluent discharge material is pumped through the pipeline, it is generally the tapered ends of the pipe which become worn out or corroded. The usual repair procedure is to cut off the tapered end of the pipe and then weld on a replacement tapered section. The cost of plant equipment for making tapered ends for pipe as well as the cost of welding the tapered end sections to the pipe is quite costly.

It is the object of this invention to provide a tapered pipe coupling, especially for shore dredge pipe, which may be installed readily and simply to obviate the need for pipe sections having tapered ends and to enable the use of plain end pipe as manufactured by all major pipe producers, and also the use of reclaimed pipe without incurring the expense of welding equipment or the labor cost of welding on tapered ends.

To realize the objective of this invention, I provide a so-called double tapered pipe coupling of the sleeve type, in which the smaller diameter downstream end is tapered inwardly toward the end at an angle of between 3½° to 5° and is inserted telescopically in the downstream pipe section, whereas the larger diameter upstream end is tapered inwardly from the end at the same angle and telescopes over the upstream pipe section. To shorten the total length of the coupling sleeve, a relatively short intervening section of the sleeve connecting the downstream and upstream ends is sharply or abruptly tapered or increased in diameter. The intervening section is of a length that is preferably 0.15 to 0.20 times the diameter of the pipe sections connected by the coupling, while the overall length of the coupling is generally in the range of 1½ to 2 times the pipe diameter. The coupling provides sealed metal-to-metal connections to the pipe sections and at the same time permits limited flexure between the pipe sections without leakage.

One variant of the coupling I provide utilizes a cylindrical upstream end portion adapted for at least a temporary sealed connection to the upstream pipe section.

Another variant of the coupling which I provide utilizes a wear ring or sleeve inside the coupling sleeve which provides a smooth inner wall surface between the coupling sleeve and the upstream pipe section.

The above and other features of my novel pipe coupling will become apparent in the forthcoming detailed description of a presently preferred embodiment thereof when read in connection with the accompanying drawings, wherein.

Figure 1:
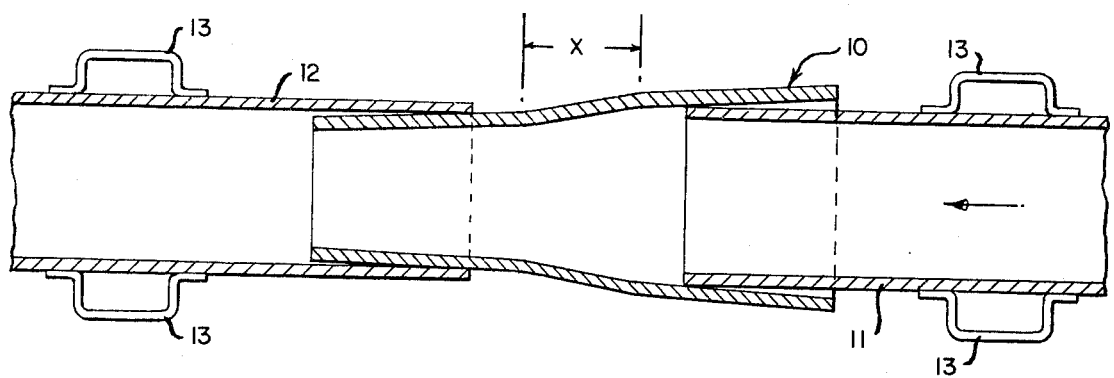
FIG. 1 is an elevational cross-sectional view of a double tapered pipe coupling installed in connecting relation to two pipe sections.

Referring to FIG. 1 of the drawings, one form of coupling 10 is shown in position connecting an upstream pipe section 11, and a downstream pipe section 12. Pipe sections 11 and 12 are representative of sections of shore dredge pipe of a diameter in the range of 12 to 36 inches. It should be understood therefore that pipe wall thickness is disproportionately shown for clarity as are other relationships and dimensions, by reason of the actually large diameter of the pipe sections.

The coupling 10 is, in actuality, a cylindrically tapered sleeve element having a smaller downstream end portion tapered inwardly toward the end and at an angle of between 3½° to 5° to the longitudinal axis so that a substantial length of the coupling sleeve fits telescopically in metal-to-metal sealed contact within the upper end of the downstream pipe section 12, while permitting slight flexure or angularity of movement therebetween. The larger opposite or upstream end of the coupling sleeve is tapered inwardly from the end at substantially the same angle or degree of slope to the horizontal as the taper on the downstream end and fits telescopically over the end of the upstream pipe section 11 in metal-to-metal sealed contact, thereby permitting a like degree of flexure or angularity of movement between the pipe sections. The overall length of the coupling is in the range of 1½ to 2 times the diameter of the pipe sections to be coupled.

The section of the coupling sleeve intervening between the downstream end portion and the upstream end portion, designated in FIG. 1 by the letter X, increases abruptly and sharply in diameter thereby shortening the overall length of the coupling sleeve. The length of the intervening section is preferably from 0.15 to 0.20 times the diameter of the pipe sections. At the same time, the arrangement of tapering both ends of the coupling sleeve enables a greater range of flexure or angularity of movement than heretofore between the upstream and downstream sections of the pipe since both pipe sections have a range of angular movement with respect to the coupling sleeve.

As shown in FIG. 1, each pipe section 11 and 12 has welded or otherwise attached thereto at least one handle or hook 13. By tying the pipe sections together, as by a wire and turnbuckle (not shown) between the handles 13, separation of the pipe sections is prevented while at the same time a metal-to-metal seal between the coupling sleeve and the ends of the pipe sections 11 and 12 is assured.

Figure 2:
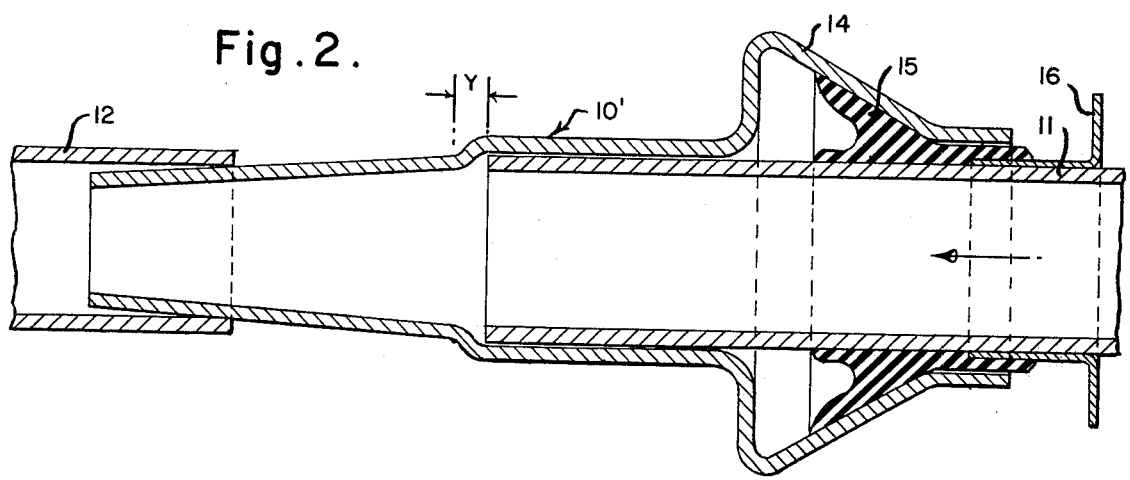
FIG. 2 is an elevational cross-sectional view of a modified embodiment of tapered coupling in which the upstream end portion is arranged for at least a temporary sealed connection with the upstream pipe section.

The form of pipe coupling 10' shown in FIG. 2 is essentially identical to the form of coupling 10 at the downstream end thereof but differs in other respects. The upstream end of coupling 10' is a generally cylindrical sleeve, the inside diameter of which conforms closely to the outer diameter of the upstream pipe section 11. A section Y of the coupling sleeve, which joins the downstream end and the upstream end, increases more sharply or abruptly in diameter such that the inside surface of the tapered downstream end is substantially flush with the inside diameter of the upstream pipe section 11. Accordingly, with flow of effluent or dredged material in the direction as indicated by the arrow in FIG. 2, there is a minimum of turbulence or abrasive wear at the point of contact of the section Y of the coupling sleeve with the downstream end of the upstream pipe section 11. The length of the section Y is from 0.15 to 0.20 times the diameter of the pipe sections 11 and 12, and preferably not in excess of 0.20 times the diameter of the pipe sections.

The upstream cylindrical portion of the coupling sleeve 10' is preferably of a length in the range of ½ to ¼ the diameter of the pipe sections, the ratio decreasing with increase in pipe diameter. At the end of the cylindrical portion is a conical extension 14 forming a conical cavity or groove therein containing an annular seal 15 of rubber or rubber composition. This type of seal is disclosed per se and described in detail in my U.S. Pat. No. 3,804,439, issued Apr. 16, 1974. As will be understood by reference to the aforesaid patent, the annular seal 15 has a central bore through which the pipe section 11 extends; and a conical body of uniform wall thickness, the outer surface of which conforms closely to the inner surface of the conical cavity. An annular flanged element 16 bonded or otherwise attached to the seal at the outer end of the central hole in the seal 15 is adapted to be grasped manually and pulled axially to wedge the annular seal between the pipe section 11 and the wall of the conical cavity in the coupling sleeve. As shown, the annular seal 15 has been pulled into sealed position with regard to the pipe section 11.

For simplicity, the handles or hooks 13, shown in FIG. 1, have been omitted from the pipe sections in FIG. 2. However, it should be understood that they are intended to be used in the embodiment shown in FIG. 2 to insure against separation of the pipe sections, notwithstanding the use of the annular seal 15.

It should be apparent that, optionally, the coupling 10' may have the conical extension 14 and seal 15 omitted therefrom to provide a simpler and less costly form of coupling.

Figure 3:
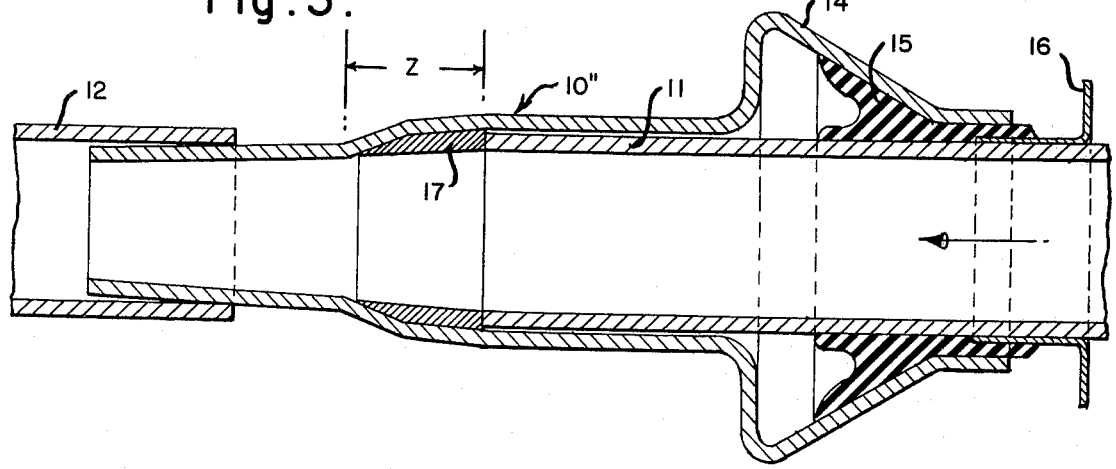
FIG. 3 is an elevational cross-sectional view of a further modified form of tapered coupling in which the coupling sleeve has an internal wear ring.

Referring to FIG. 3, another form of coupling 10'' is shown in connecting relation to pipe sections 11 and 12. Coupling 10'' is substantially similar to coupling 10' except that the coupling sleeve includes a section Z which joins the tapered downstream end of the coupling sleeve and the cylindrical upstream end of the coupling sleeve. Corresponding parts in couplings 10'' and 10' will thus be designated by the same reference numerals, without repetitive description in connection with coupling 10''.

Section Z of the coupling sleeve of coupling 10'' has an overall length preferably about 0.15 to 0.20 times the diameter of the pipe sections. Section Z has a portion of its length which increases sharply in diameter and an additional length tapering at the same slope as the downstream tapered end until juncture with the end of the cylindrical portion of the coupling sleeve. Disposed in the annular groove or recess formed on the interior of the coupling sleeve at the section Z is a so-called "wear ring" 17. Wear ring 17 abuts the downstream end of the pipe section 11 and the inner tapered hole or bore thereof provides a smooth unobstructed bridge between the inner wall surface of the pipe section 11 and the inner surface of the tapered portion of the coupling sleeve, thus minimizing turbulence and consequent abrasion by the effluent flowing through the coupling.

Wearing ring 17 may be expanded into position incidental to the forming of the sleeve element of the coupling or it may be installed after the coupling sleeve is formed. Wear ring 17 is intended to be replaceable when it wears out, thus greatly extending the service life of the coupling 10''. Accordingly, it is preferably non-adhesively secured within the sleeve element to facilitate removal therefrom.

As in the case of the coupling 10' of FIG. 2, coupling 10'' may be formed with a coupling sleeve which omits the conical extension 14 and annular seal 15.

While the invention has been described in relation to specific embodiments thereof, it will be apparent that variations therein may be made within the terms of the appended claims.

I claim:

1. A pipe coupling of the threadless sleeve type for connecting two juxtaposed metallic dredge pipe sections, said coupling comprising a sleeve element of metal one end portion of which is tapered so as to fit telescopically within the downstream pipe section to provide metal-to-metal contact therewith, said taper being in the range of about 3½° to 5°, said sleeve element having its opposite end portion formed to telescopically surround the upstream pipe section and having a relatively short section of varying diameter intervening between said two end portions, the said opposite end portion of said sleeve element having a section of uniform diameter closely surrounding the end of the upstream pipe section, said uniform diameter section having a length varying with respect to the diameter of the pipe in the ratio of ½ to ¼, and terminating in a section forming a conical recess in surrounding relation to the upstream pipe section, and having a seal ring therein, said seal ring having a conical surface and being shiftable axially from a non-sealing position into a wedged position between the conical surface of said recess and the external surface of the upstream pipe section to provide a seal.

2. A pipe coupling of the threadless sleeve type according to claim 1, wherein said intervening section of the sleeve element is of a length in the order of about 0.15 to 0.20 times the diameter of the pipe, and is formed to provide an annular recess internally of said sleeve element, and an annular sleeve is fitted into said recess and flushly abuts the end of the upstream pipe section.

3. A pipe coupling according to claim 2, wherein said annular sleeve is made of wear resistant metal.

4. A pipe coupling according to claim 2, wherein said annular sleeve is non-adhesively fitted into said annular recess in the said sleeve element so as to be removable therefrom and replaceable with a second wear ring.

5. A pipe coupling according to claim 2, wherein said annular sleeve has an internal bore tapered to provide a smooth gradation from the internal diameter of the upstream pipe section to the internal bore of the said tapered portion of the coupling.

* * * * *